United States Patent
Liu et al.

(10) Patent No.: US 7,783,319 B2
(45) Date of Patent: Aug. 24, 2010

(54) ADJUSTMENT METHOD FOR CONTROL THRESHOLD OF TERMINAL FORWARD TRANSMISSION POWER IN A MOBILE COMMUNICATION SYSTEM

(75) Inventors: Xuemin Liu, Shenzhen (CN); Xin Li, Shenzhen (CN); Xiaohan Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 555 days.

(21) Appl. No.: 11/792,164

(22) PCT Filed: Dec. 2, 2004

(86) PCT No.: PCT/CN2004/001400

§ 371 (c)(1),
(2), (4) Date: Jun. 1, 2007

(87) PCT Pub. No.: WO2006/058460

PCT Pub. Date: Jun. 8, 2006

(65) Prior Publication Data

US 2008/0144520 A1 Jun. 19, 2008

(51) Int. Cl.
*H04B 7/00* (2006.01)
*H04Q 7/20* (2006.01)

(52) U.S. Cl. ............... 455/522; 455/67.11; 455/69; 455/127.1; 370/252; 370/318

(58) Field of Classification Search ........... 455/522, 455/69, 67.11, 117, 517, 88, 13.4, 437, 424, 455/115.1, 127.1, 67.13, 442, 63.1, 70, 126, 455/115.3; 370/252, 311, 335, 318, 332, 370/338
See application file for complete search history.

(56) References Cited

U.S. PATENT DOCUMENTS

| | | | | |
|---|---|---|---|---|
| 6,151,508 A * | 11/2000 | Kim et al. | ............... | 455/522 |
| 6,529,482 B1 * | 3/2003 | Lundby | ............... | 370/252 |
| 7,269,389 B2 * | 9/2007 | Petrus et al. | ............... | 455/69 |
| 7,515,923 B2 * | 4/2009 | Lee et al. | ............... | 455/522 |
| 7,603,134 B2 * | 10/2009 | Cho | ............... | 455/522 |
| 2007/0129096 A1 * | 6/2007 | Okumura et al. | ............... | 455/522 |
| 2008/0004064 A1 * | 1/2008 | Sakurai et al. | ............... | 455/522 |

FOREIGN PATENT DOCUMENTS

| | | |
|---|---|---|
| EP | 0961417 A2 | 12/1999 |
| EP | 1139580 A2 | 10/2001 |
| WO | WO 0003499 | 1/2000 |

* cited by examiner

*Primary Examiner*—Sujatha Sharma
(74) *Attorney, Agent, or Firm*—Thomas, Kayden, Horstemeyer & Risley, LLP

(57) ABSTRACT

The present invention relates to a method for adjusting forward transmission power control threshold of a terminal in a mobile communication system, including the following steps of setting in advance at a base station side a forward pilot threshold and a lower bound, an upper bound of a forward transmission power control threshold as well as adjustment ranges of said lower bound and upper bound; obtaining the current forward pilot energy measured and reported by the terminal; judging whether the forward pilot energy exceeds said forward pilot threshold; and adjusting the forward transmission power control threshold of the terminal. In the invention, the forward pilot energy reported by the terminal is judged and adjusted through the pre-set parameters above, so as to dynamically adjust the forward transmission power control threshold of the terminal in the sector, reduce call drop rate, and promote the communication quality of a CDMA mobile communication system.

7 Claims, 2 Drawing Sheets

ADJUSTMENT METHOD FOR CONTROL THRESHOLD OF TERMINAL FORWARD TRANSMISSION POWER IN A MOBILE COMMUNICATION SYSTEM

TECHNICAL FIELD

The present invention relates to a method for adjusting a forward transmission power control threshold of a terminal in a mobile communication system, especially to a method used in a CDMA mobile communication system for dynamically adjusting the control threshold of the forward transmission power of any given terminal according to the signal quality of practical channel of the given terminal in a sector. The invention belongs to the communication technique field.

BACKGROUND ART

In a CDMA mobile communication system, the power control will directly influence the communication performance of the system, which is mainly characterized in communication capacity and call drop rate.

The method of controlling the forward power of a terminal in a sector in a CDMA mobile communication system usually includes open loop, closed loop, and outer loop control, wherein a control range of the terminal forward transmission power, i.e. the control threshold range of the forward transmission power Ptx_lower and Ptx_upper, needs to be set in the closed loop control, and the actual forward transmission power is confined within the range of these two power thresholds. Ptx_lower is the lower bound of the forward transmission power; if it is too low, call drop will easily happen, especially in fast fading areas, and if it is too high, the capacity of system will be affected. Ptx_upper is the upper bound of forward transmission power; if it is too low, the voice quality can not be ensured in places with bad signal quality, and meanwhile call drop happens easily, and if it is too high, the capacity of system will also be affected, resulting in an overload of the forward transmission power easily. Therefore, determining a suitable upper bound and lower bound of the control threshold of the forward transmission power is important for promoting the performance of a CDMA mobile communication system.

Usually, in a system (or in a sector), Ptx_lower and Ptx_upper are fixed, and are experiential values under theoretical instructions. Due to the particular complexity of mobile communication, the transmission power of a base station is sometimes required to be low, and some other times to be high. As a result, the range of the forward transmission power that is required in practice is fluctuant. The fixed Ptx_lower and Ptx_upper can not adapt to the variation of communication environment varying dynamically and the fluctuation of call capacity, and can not trace this variation in real-time.

In an environment with a complex terrain, there are many shadow areas with small range. When a terminal in a sector gets into a shadow area, if the forward transmission power can not be increased accordingly, the voice quality usually becomes bad due to a sudden deterioration of forward signals, and the threshold of a forward frame error counter maintained by the terminal may even be triggered, which will result in a call drop. Since the mobile station maintains a forward frame error counter, the link will be released and a call drop will occur if the counter exceeds a certain threshold. At this moment, if the upper bound of the forward transmission power is promoted properly to enable the forward transmission power of the mobile station to increase, triggering of the counter will be postponed while the voice quality will be enhanced, and it can be ensured that the forward frame error counter will not exceed the released established threshold value before the mobile station departs from the shadow area.

Additionally, since a process is needed when the terminal implements forward pilot search and soft handoff, if the processing time of searching handoff pilot and/or implementing the soft handoff is too long, in a case that the forward transmission power can not be promoted properly, strong pilot interference will easily lead to a bad forward link quality, and may also lead to a result that the forward signaling can not be demodulated and finally a call drop occurs.

Currently, there are some methods for dynamically adjusting and controlling the forward power of a CDMA mobile communication system, such as the method of channel adaptive power control. This method uses a group of different TPC algorithms (TPCAs) of any size, and the transmission power can be controlled in an adaptive way of channels. Each TPCA should adapt well to a particular type of channels. In this method, it is required to establish different algorithms and rules for determining whether an algorithm is good. However, the use of different algorithms for tracing channels can not ensure the feature of real-time.

To summarize all above, how to optimize the control effect of forward transmission power of the terminal in a CDMA mobile communication system and promote the communication quality of the system is an important technique problem that needs to be solved by the skilled in the art.

SUMMARY OF THE INVENTION

The purpose of the invention is to provide a method for adjusting the control threshold of terminal forward transmission power in a mobile communication system to solve the above problem that the communication quality of a terminal decreases or call drops occur because the variation of the practical signal quality can not be traced well due to a fixed control threshold of terminal forward transmission power in a CDMA mobile communication system. In the method, the communication quality of a CDMA mobile communication system is promoted by adjusting dynamically the forward transmission power control threshold of a terminal to reduce call drop rate according to the quality of the terminal forward signal in a sector of a CDMA mobile communication system.

For the purpose above, the invention adopts a method for adjusting the control threshold of terminal forward transmission power in a mobile communication system, which includes the following steps of:

a. setting in advance at a base station side a forward strong pilot threshold and a lower bound (Ptx_lower), an upper bound (Ptx_upper) of the forward transmission power control threshold as well as adjusting ranges of said lower bound and upper bound; wherein said adjusting ranges of lower bound and upper bound is the width within which lower bound and upper bound of said forward transmission power control threshold are permitted to fluctuate;

b. obtaining the current forward pilot energy measured and reported by the terminal through the base station;

c. judging whether said forward pilot energy exceeds said forward strong pilot threshold; if so, continuing to implement step d, otherwise, turning to step f;

d. judging whether the current forward transmission power of said terminal exceeds the adjustment ranges of said lower bound and upper bound; if not, performing the operation of reducing the forward transmission power control threshold of said terminal, and if yes, turning to step f;

f. completing one dynamical adjustment of the forward transmission power control threshold of the terminal.

In the scheme above, after completing every pre-setting operation, the base station side can obtain the current forward pilot energy of the terminal by using a mode of terminal report trigger. A polling mode can also be employed to cover all terminals in the sector to obtain the current forward pilot energy of the terminal.

The process of pre-setting the adjustment ranges of lower bound and upper bound of the forward transmission power control threshold above includes: a step of pre-setting a parameter Δ for adjusting step length and a step of pre-setting the permitted adjustment times m.

The adjustment ranges of the lower bound and upper bound of the forward transmission power control threshold obtained from the product of the parameter Δ for adjusting step length and the permitted adjustment times m are as follows:

lower bound (Ptx_lower, Ptx_lower+mΔ);
upper bound (Ptx_upper, Ptx_upper+mΔ);

If the adjustment ranges of lower bound and upper bound are set by using the parameter Δ for adjusting step length and the permitted adjustment times m, when the forward transmission power control threshold corresponding to the terminal is reduced, the detailed operating process can be as follows: judging whether the forward transmission power control threshold can exceed the adjustment range of the lower bound or the upper bound after this adjustment; if so, the adjustment can not be performed; otherwise, the forward transmission power control threshold of the terminal is reduced according to the value corresponding to one parameter Δ for adjusting step length.

Additionally, when the forward strong pilot threshold is pre-set at the base station side, a forward weak pilot threshold can also be pre-set at the same time. The reasons are, if the forward pilot energy does not exceed the forward strong pilot threshold, it only means that the forward signal quality of the terminal is not very good, and its forward transmission power control threshold may not be reduced, but whether its forward signal quality is bad can not be confirmed. Therefore, in such a case, adding a step for judging whether the forward pilot energy of the terminal is lower than the weak pilot threshold can provide a better communication service for terminals in the sector. The detailed process is: if the forward pilot energy of the terminal is not lower than the weak pilot threshold, it means that the forward signal quality of the terminal is normal and its forward transmission power control threshold does not need to be adjusted; if the forward pilot energy of the terminal is lower than the weak pilot threshold, it means that the forward signal quality of the terminal is bad, and then whether the current forward transmission power control threshold of this terminal exceeds the adjustment ranges of lower bound and upper bound is judged, if not, the forward transmission power control threshold corresponding to the terminal is raised; if yes, it means that the maximum adjustment has been made and thus a dynamical adjustment of the forward transmission power control threshold of a terminal has been completed.

In the operating process above for raising the forward transmission control threshold corresponding to a terminal, the following steps can also be added:

judging whether the adjustment range of lower bound or upper bound will be exceeded after this adjustment; if so, the adjustment can not be performed; otherwise, the forward transmission power control threshold of the terminal is raised according to the value corresponding to one parameter Δ for adjusting step length.

In a specific application of the above technical scheme, whether the total forward transmission power of the sector in which the terminal locates is in an overload state should be confirmed firstly, because if so, the base station can not continue to raise the forward transmission power control threshold of the terminal.

When intensity of a pilot is determined, the strongest pilot energy can be used to compare with the threshold, and the combined pilot energy can also be used to compare with the threshold.

From the technical scheme above, the invention judges and adjusts the forward pilot energy reported by the terminal through the pre-set parameters of a forward pilot threshold, a lower bound (Ptx_lower) and an upper bound (Ptx_upper) of the forward transmission power control threshold, and adjustment ranges of lower bound and upper bound, so as to adjust dynamically the forward transmission power control threshold of the terminal in the sector, reduce the call drop rate, and promote the communication quality of a CDMA mobile communication system.

In the following, the invention will be described further by way of specific embodiments with reference to the attached drawings.

PREFERRED EMBODIMENT OF THE INVENTION

Figure 1:
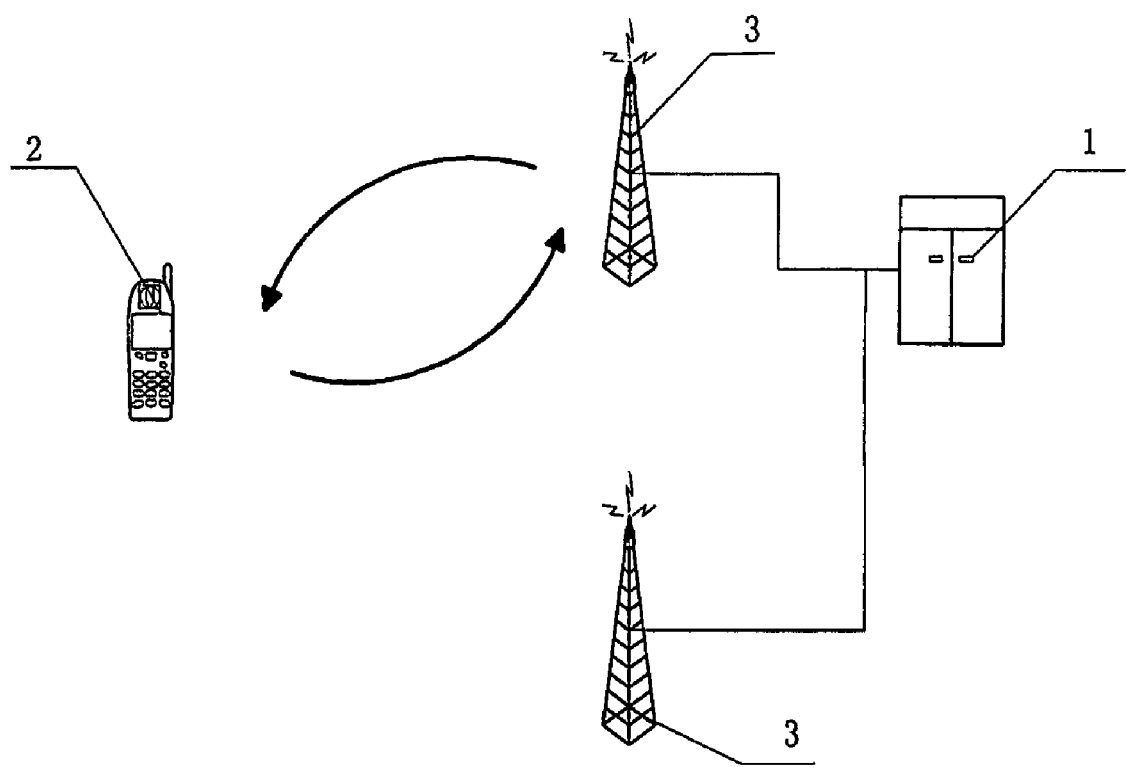
FIG. 1 is a schematic view of the structure of a CDMA mobile communication system relating to the invention.

FIG. 1 shows a basic method for forward power control in a CDMA mobile communication, including forward open-loop power control, forward closed-loop power control, and forward outer-loop power control, wherein when a forward link is initially established, the initial transmission power of the forward link is determined by forward open-loop power control, and it is usually set by the resource library of base station controller 1.

The forward closed-loop power control relates to terminal 2 and a base station 3. Terminal 2 decides whether a power increase command or a power decrease command (referred to as forward power control bit) is transmitted on a backward link by measuring the signal quality of the forward link, such as SNR, and comparing the actually measured value with the objective one. After station 3 receives a forward power control bit, it increases or decreases the transmission power of the forward link according to the value of the bit. The period of the forward closed-loop power control is usually much less than a frame period. Generally, if the measured value is less than the objective value, an increase command is sent; if the measured value is greater than the objective value, a decrease command is sent.

The final purpose of power control is to maintain a certain voice quality, and the voice quality correlates directly with frame error rate or byte error rate. A typical way is to determine a frame error rate with a good voice quality. A frame error rate demanded by the voice quality is realized by forward outer-loop power control through adjusting the objective value of the forward closed-loop power control. The forward outer-loop power control is implemented at terminal 2, the objective frame error rate and some outer-loop control thresholds are set by the base station controller 1 and sent to terminal 2 on air channels.

Figure 2:
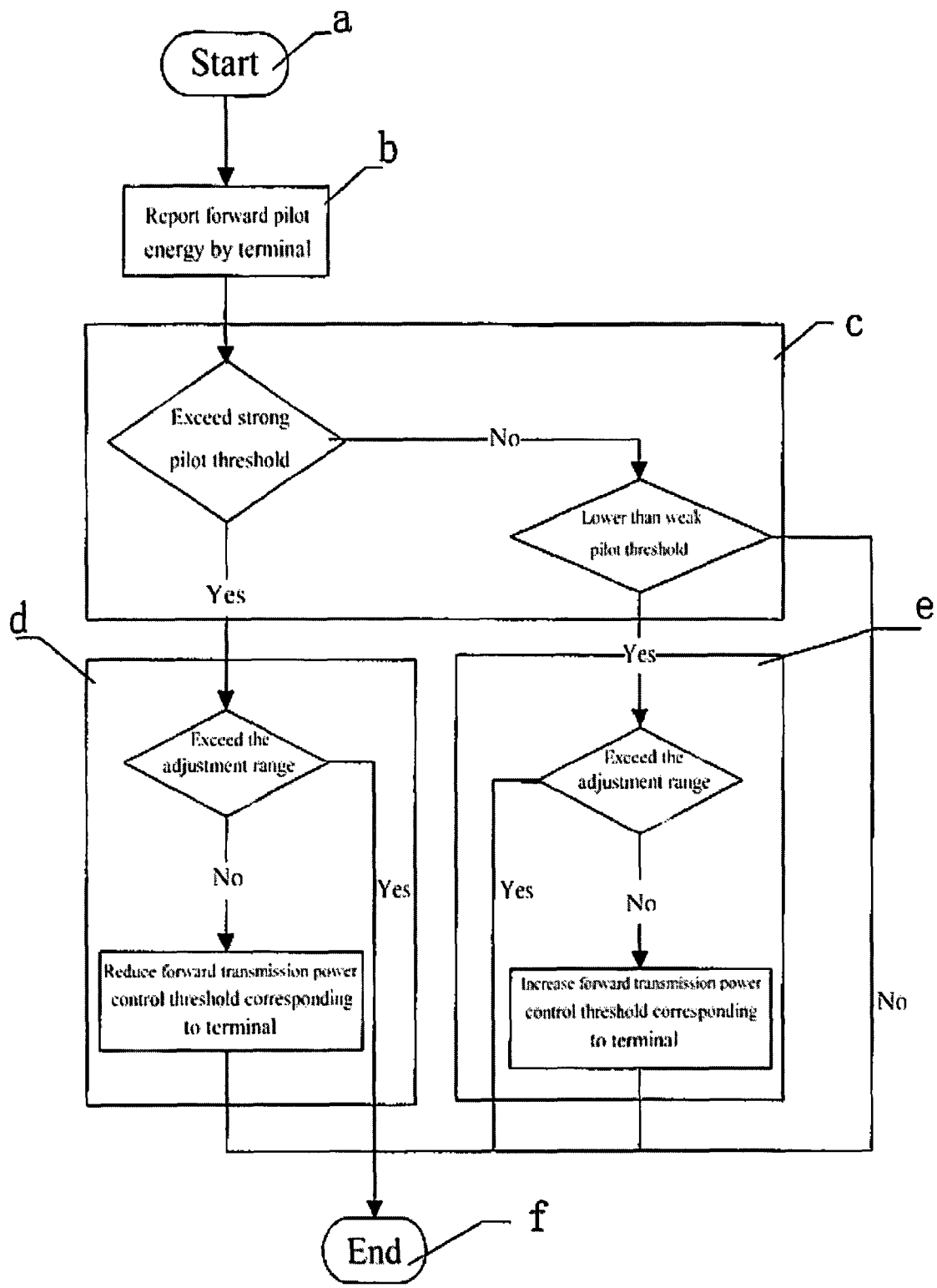
FIG. 2 is a flow chart of a specific embodiment provided by the invention.

FIG. 2 is a flow chart of a specific embodiment of the method provided by the invention. When the forward transmission power control threshold of the terminal in the sector is implemented, the process is as follows:

Step a, setting in advance at the base station side a forward strong pilot threshold, a forward weak pilot threshold, a lower bound (Ptx_lower) and an upper bound (Ptx_upper) of the forward transmission power control threshold as well as adjustment ranges of said lower bound and upper bound, wherein the adjustment ranges of said lower bound and upper bound are the width within which the lower bound and upper bound of said forward transmission power control threshold are permitted to fluctuate, specifically referred to pre-set parameter $\Delta$ for adjusting step length and permitted adjustment times m;

The product of the parameter $\Delta$ for adjusting step length and the permitted adjustment times m combines with the lower bound (Ptx_lower) and upper bound (Ptx_upper) to make the adjustment range of the lower bound to be (Ptx_lower, Ptx_lower+m$\Delta$) and the adjustment range of the upper bound to be (Ptx_upper, Ptx_upper+m$\Delta$).

Step b, obtaining the current forward pilot energy reported and measured by the terminal through the base station;

Step c, judging whether the forward pilot energy exceeds the forward strong pilot threshold; if so, continuing to perform step d, if not, judging whether the forward pilot energy is lower than the weak pilot threshold;

Step d, judging whether the current forward transmission power control threshold of said terminal exceeds the adjustment range of the lower bound or the upper bound above; if not, performing the operation of reducing the forward transmission power control threshold of the terminal, and if yes (including equal), it indicating that the maximum adjustment has been made, then turning to step f.

Step f, completing a dynamical adjustment of the forward transmission power control threshold of the terminal, and ending;

In step c and step d above, if the forward pilot energy reported by the terminal exceeds the strong pilot threshold, it means that the forward signal is very good and the power control threshold can be reduced properly, while if the forward pilot energy reported by the terminal does not exceed the strong pilot threshold, it means that the forward signal is not very good, in this case, whether to further adjust its forward transmission power control threshold depends on further judging whether the forward pilot energy is lower than the weak pilot threshold or not.

In step c, if the forward pilot energy is not lower than the weak pilot threshold, it means that the voice quality and the frame error rate or the byte error rate of this terminal are in a normal state, the forward transmission power control threshold does not need to be adjusted, and the process ends directly. If the forward pilot energy is lower than the weak pilot threshold, it means that the forward signal is bad, the power control threshold should be raised properly to ensure that the forward signal may be sent with enough power at the base station side, and the quality of the forward link should be maintained, thus turning to step e.

Step e, judging whether the current forward transmission power control threshold of the terminal exceeds the adjustment ranges of the lower bound and upper bound; if not, raising the forward transmission power control threshold corresponding to said terminal, and if yes, turning to step f;

In step d above, when decreasing the forward transmission power control threshold corresponding to the terminal, the operating process is as follows:

judging whether the adjustment range of the lower bound or upper bound will be exceeded after this adjustment; if yes, turning to step f; otherwise, reducing the forward transmission power control threshold of the terminal according to the value corresponding to one parameter $\Delta$ for adjusting step length.

Similarly, in step e above, when increasing the forward transmission power control threshold corresponding to the terminal, the operation process is as follows:

judging whether the adjustment range of the lower bound or upper bound will be exceeded after this adjustment; if yes, turning to step f; otherwise, raising the forward transmission power control threshold of the terminal according to the value corresponding to one parameter $\Delta$ for adjusting step length.

Through the above process of dynamically adjusting the control threshold, the forward signal quality of a terminal in a sector can be in a good transmission state, and meanwhile, call drops in some fast fading area are also reduced.

To conclude, when obtaining information of forward pilot signal intensity or the like received by the terminal, the present invention reduces or avoids call drops of the terminal by dynamically adjusting the forward transmission power control threshold, and it is simple, practicable and effective in promoting the system performance.

What we claim is:

1. A method for adjusting a forward transmission power control threshold of a terminal in a mobile communication system, comprising the following steps of:
   a. setting in advance at a base station side a forward strong pilot threshold, a lower bound (Ptx_lower) and an upper bound (Ptx_upper) of a forward transmission power control threshold as well as adjustment ranges of said lower bound and upper bound; the adjustment ranges of said lower bound and upper bound being the width within which said lower bound and upper bound of the forward transmission power control threshold are permitted to fluctuate;
   b. obtaining a current forward pilot energy reported and measured by the terminal through the base station;
   c. judging whether said forward pilot energy exceeds said forward strong pilot threshold, if yes, continuing to perform step d, otherwise, turning to step f;
   d. judging whether the current forward transmission power of said terminal exceeds the adjustment ranges of said lower bound and upper bound, if not, performing an operation of reducing the forward transmission power control threshold of said terminal, and if yes, turning to step f;
   f. completing a dynamical adjustment of the forward transmission power control threshold of the terminal.

2. The method for adjusting a forward transmission power control threshold of a terminal in a mobile communication system of claim 1, wherein
   in said step a, the process of pre-setting the adjustment ranges of said lower bound and upper bound also comprises a step of pre-setting a parameter ($\Delta$) for adjusting step length and a step of pre-setting permitted adjustment times m;
   the product of said parameter ($\Delta$) for adjusting step length and said permitted adjustment times m makes the adjustment range of said lower bound to be (Ptx_lower, Ptx_lower+m$\Delta$) and the adjustment range of said upper bound to be (Ptx_upper, Ptx_upper+m$\Delta$).

3. The method for adjusting a forward transmission power control threshold of a terminal in a mobile communication system of claim 2, wherein the operating process in said step d of decreasing the forward transmission power control threshold corresponding to said terminal is as follows:
   judging whether the adjustment range of said lower bound or upper bound will be exceeded after this adjustment; if yes, turning to step f, and if not, reducing the forward transmission power control threshold of said terminal according to the value corresponding to one said parameter (Δ) for adjusting step length.

4. The method for adjusting a forward transmission power control threshold of a terminal in a mobile communication system of claim 1, wherein said step a further includes a step of pre-setting a forward weak pilot threshold at the base station side;

in said step c, if said forward pilot energy does not exceed said forward strong pilot threshold, a step of judging whether said forward pilot energy is lower than said weak pilot threshold is added; if said forward pilot energy is not lower than said weak pilot threshold, turn to step f; if it is lower than said weak pilot threshold, turn to an added step e;

said step e: judging whether said current forward transmission power of the terminal exceeds the adjustment ranges of the lower bound and the upper bound; if not, raising the forward transmission power control threshold corresponding to said terminal; if yes, turning to step f.

5. The method for adjusting a forward transmission power control threshold of a terminal in a mobile communication system of claim 4, wherein the operating process of increasing the forward transmission power control threshold corresponding to said terminal in said step e is as follows:

judging whether the adjustment ranges of the lower bound or the upper bound will be exceeded after this adjustment; if yes, turning to step f, if not, raising the forward transmission power control threshold of said terminal according to the value corresponding to one said parameter (Δ) for adjusting step length.

6. The method for adjusting a forward transmission power control threshold of a terminal in a mobile communication system of claim 2, wherein said step a further includes a step of pre-setting a forward weak pilot threshold at the base station side;

in said step c, if said forward pilot energy does not exceed said forward strong pilot threshold, a step of judging whether said forward pilot energy is lower than said weak pilot threshold is added; if said forward pilot energy is not lower than said weak pilot threshold, turn to step f; if it is lower than said weak pilot threshold, turn to an added step e;

said step e: judging whether said current forward transmission power of the terminal exceeds the adjustment ranges of the lower bound and the upper bound; if not, raising the forward transmission power control threshold corresponding to said terminal; if yes, turning to step f.

7. The method for adjusting a forward transmission power control threshold of a terminal in a mobile communication system of claim 3, wherein said step a further includes a step of pre-setting a forward weak pilot threshold at the base station side;

in said step c, if said forward pilot energy does not exceed said forward strong pilot threshold, a step of judging whether said forward pilot energy is lower than said weak pilot threshold is added; if said forward pilot energy is not lower than said weak pilot threshold, turn to step f; if it is lower than said weak pilot threshold, turn to an added step e;

said step e: judging whether said current forward transmission power of the terminal exceeds the adjustment ranges of the lower bound and the upper bound; if not, raising the forward transmission power control threshold corresponding to said terminal; if yes, turning to step f.

\* \* \* \* \*